United States Patent [19]

Giguere

[11] Patent Number: 4,518,907
[45] Date of Patent: May 21, 1985

[54] DIGITAL MOTOR CONTROL METHOD AND MEANS

[75] Inventor: Irving J. Giguere, Bristol, Conn.

[73] Assignee: The Superior Electric Company, Bristol, Conn.

[21] Appl. No.: 549,438

[22] Filed: Nov. 7, 1983

[51] Int. Cl.³ .............................................. H02K 29/04
[52] U.S. Cl. .................................... 318/696; 318/685
[58] Field of Search ................. 318/696, 685; 360/78, 360/86

[56] References Cited

U.S. PATENT DOCUMENTS 4,453,188  6/1984  Johnson et al. ...................... 360/78

Primary Examiner—Vit W. Miska
Assistant Examiner—Saul M. Bergmann
Attorney, Agent, or Firm—John H. Crozier

[57] ABSTRACT

A method and system for controlling a digital motor to allow operation in a microstepping mode at low velocities where microstepping is advantageous and to allow operation in a non-microstepping mode at high motor velocities to take advantage of the higher torque attainable. The transition from microstepping to non-microstepping or from non-microstepping to microstepping is accomplished free of velocity perturbations in the motor phases.

6 Claims, 10 Drawing Figures

DIGITAL MOTOR CONTROL METHOD AND MEANS

This invention relates to the control of digital motors, and more particularly to the continuous control of such a motor to permit operation in a microstepping mode at low motor velocities; while, at high motor velocities, the motor can be operated in a non-microstepping mode.

"Microstepping", also known as "ministepping", is defined as that mode of operation of a digital motor wherein the magnitudes of the currents in the various motor phases are programmably adjusted in accordance with some relationship such as, in the case of a motor having two phases, the sine/cosine law. "Non-microstepping" is defined as that mode of operation of a digital motor wherein the current in any given motor phase at any given time is switched either fully on or fully off.

The technique of microstepping to provide improved resolution in the control of digital motors is well known. It is also known that such technique can reduce motor torque to as little as about 70 percent of the torque of a digital motor operated in a non-microstepping mode. Additionally, normal microstepping requires an input pulse rate equal to the product of motor velocity times the microstepping resolution, which, at high motor velocities, requires high-speed transmission lines or shielded cables. Further, microstepping is of little value at higher motor velocities, since digital motors do not respond to high-speed current changes above a velocity of about 500 full steps per second. On the other hand, the non-microstepping mode of control offers greater torque, but also poor resolution at low motor velocities. It would, therefore, be advantageous to combine microstepping at low motor velocities with non-microstepping at high motor velocities. Heretofore, however, attempts to control digital motors in such a manner have been unsatisfactory, due to velocity perturbations produced in the motor when switching between the two control modes.

Accordingly, it is an object of the present invention to provide a control method that will permit the use of microstepping at low motor velocities and permit the use of non-microstepping at high motor velocities, while providing for a smooth transition between the stepping modes, whether from microstepping to non-microstepping or from non-microstepping to microstepping. Another object of the present invention is to eliminate the requirement for high speed transmission lines or shielded cables.

The present invention accomplishes these objects by providing motor phase currents having waveforms such that, at recurring points in time, the current in each phase corresponds to that for either microstepping or non-microstepping modes. The transition between the modes can occur at any one of these points in time. Thus, a motor may be operated in a microstepping mode at low motor velocities, where high resolution is important; then, when the motor velocity reaches a predetermined value, the control mode can be switched to non-microstepping to obtain increased torque, the transition being achieved without introducing undesirable velocity perturbations. The transition velocity may be chosen at a value low enough that the use of high-speed transmission lines or shielded cables is unnecessary.

While the present invention is hereinafter described as applied to a two-phase digital motor having each phase comprise two windings, with four full steps moving the rotor one tooth pitch, or 360 electrical degrees, it will be understood that the invention, with suitable modifications obvious to one having ordinary skill in the art, may be applied to digital motors having other phase/winding configurations.

Figure 1:
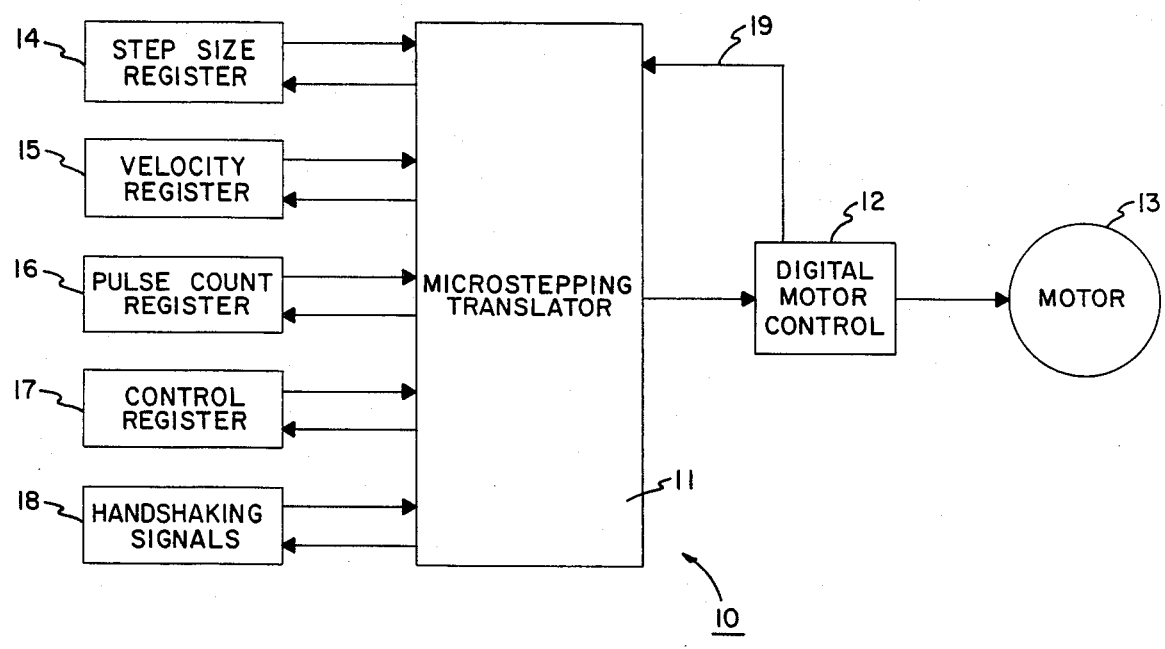
FIG. 1 is a system block diagram of a digital motor drive employing the present invention.

Referring to FIG. 1, a digital motor drive employing the present invention is generally indicated by the reference numeral 10 and includes a microstepping translator 11 which provides control signals to a digital motor control 12 which provides driving pulses to a digital motor 13. Command inputs to the translator 11 include a step size input register 14 into which is entered step size, e.g., 1/128 (equivalent to 128 microsteps per full step). The number of steps per unit time is entered into a velocity input register 15 and the number of microsteps to be taken is entered into a pulse count input register 16. Direction of movement and time of initiation of movement are entered into a control input register 17. A handshaking signals register 18 may be included to confirm that the translator 11 has received the inputs from the other registers 15, 16, 17, and 18, which registers may be set manually or by mechanical or electrical/electronic means.

Although not required for the practicing of the present invention, a feedback stabilizing pulse from the motor phase drive 13 to the translator 11 may be included as an input on a lead 19 to a stabilizing circuit in the translator 11, such as described in U.S. Pat. No. 4,220,904, assigned to the assignee of the present invention. Such a circuit minimizes stepping motor oscillation at certain velocities when in a non-microstepping mode.

Figure 2:
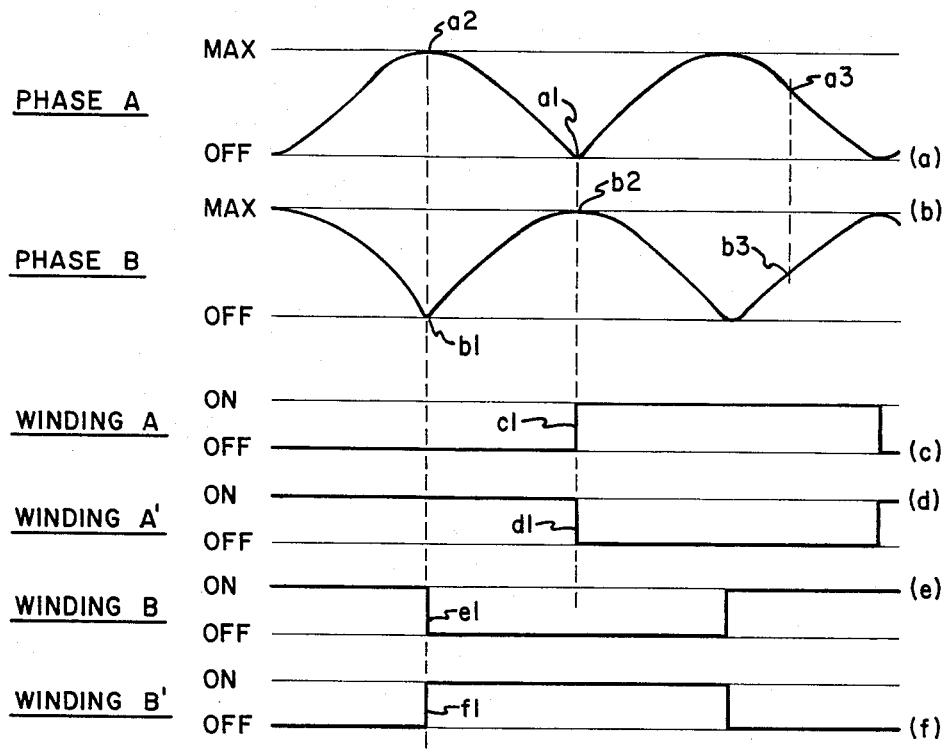
FIG. 2 shows phase current and winding on/off condition waveforms for a two-phase, four-winding digital motor in a conventional microstepping mode.

Referring to FIG. 2, curves (a) and (b) show the current flowing as a function of time, in a conventional microstepping mode, through the two phases, here referred to as Phase A and Phase B, which approximate sine waves displaced by 90 electrical degrees to produce torque. The curves (a) and (b), of course, are not smooth as shown, but comprise sawtoothed microsteps, the number of which per full motor step depends on the degree of microstepping desired, but typically range up to 128 microsteps per full step, although there is no upper limit relative to the present invention. Curves (c) and (d) show the on/off conditions of the windings associated with Phase A, here designated as Winding A and A'; and curves (e) and (f) show the on/off conditions of the Windings associated with Phase B, here designated as Winding B and Winding B'. Each phase is in a microstepping mode at all times and switching of the windings in a phase takes place when the current in that phase is zero. For example, when the current in Phase B is zero, as at point b1 on curve (b), Winding B is switched from on to off at point e1 on curve (e), and Winding B' is switched from off to on at point f1 on curve (f). Similarly, when the current in Phase A is zero, as at point a1 on curve (a), Winding A is switched from off to on at point c1 on curve (c), and Winding A' is switched from on to off at point d1 on curve (d).

Figure 3:
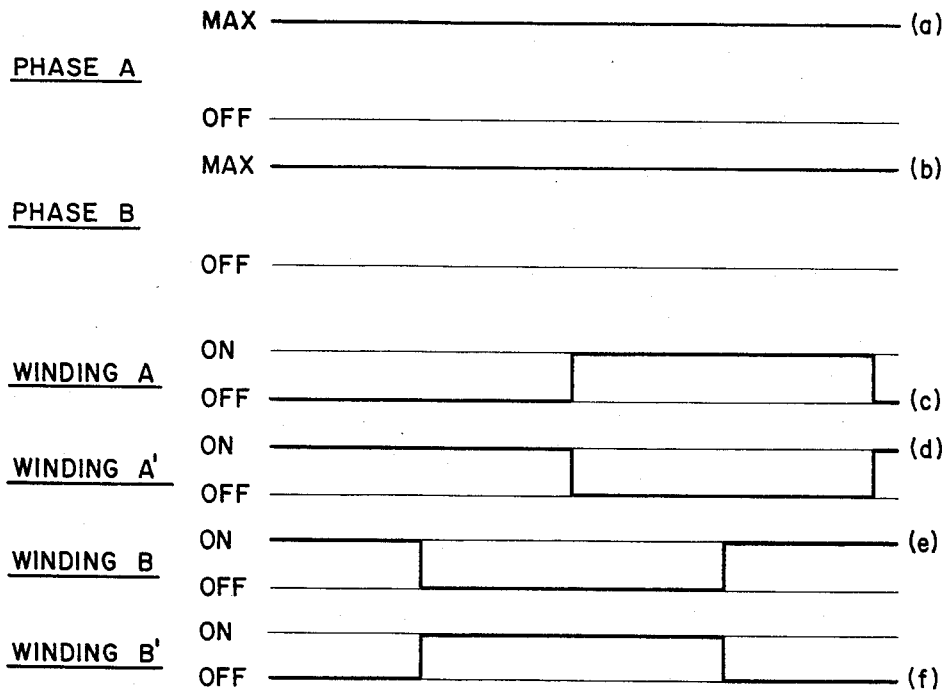
FIG. 3 shows phase current and winding on/off condition waveforms for the same motor in a full-stepping, two-windings-on mode.

Referring to FIG. 3, the curves are designated similarly to those in FIG. 2, except that, in this case, the motor is operating in a non-microstepping mode, specifically a full-stepping, two-windings-on mode, with maximum current in each winding at all times. The current in the windings is switched to produce on/off condition waveforms, curves (c), (d), (e), and (f), identical to the respective waveforms on FIG. 2; however, it will be recognized that the operating mode represented by FIG. 3 will produce greater torque than that represented by FIG. 2, due to the higher phase currents.

While, as noted above, it would be desirable to be able to operate a digital motor in a microstepping mode at lower speeds where precision is important and to operate the motor in a non-microstepping mode at higher speeds to take advantage of the resulting higher torque, it is obvious from inspection of curves (a) and (b) on FIG. 2 that at no point in time could the currents in the windings be switched to maximum without producing a current discontinuity, or disturbance, in one or both windings. For example, referring again to FIGS. 2 and 3, if a transition from microstepping to full-stepping were made when the current in Phase B were zero such as at point b1 corresponding in time to point a2 where Phase A would be at maximum current, there would be a disturbance in Phase B as the current in that phase increased instantaneously from zero to maximum. Likewise, if a transition were made when the current in Phase A were zero, such as at point a1 corresponding in time to point b2 where Phase B would be at maximum current, there would be a disturbance in Phase A as the current increased instantaneously from zero to maximum. However, if the transition occurred at some time when neither phase were at maximum current, such as at the corresponding points a3 and b3, there would be disturbances in both phases. Similar disturbances would occur in a transition from full-stepping to microstepping.

Figure 4:
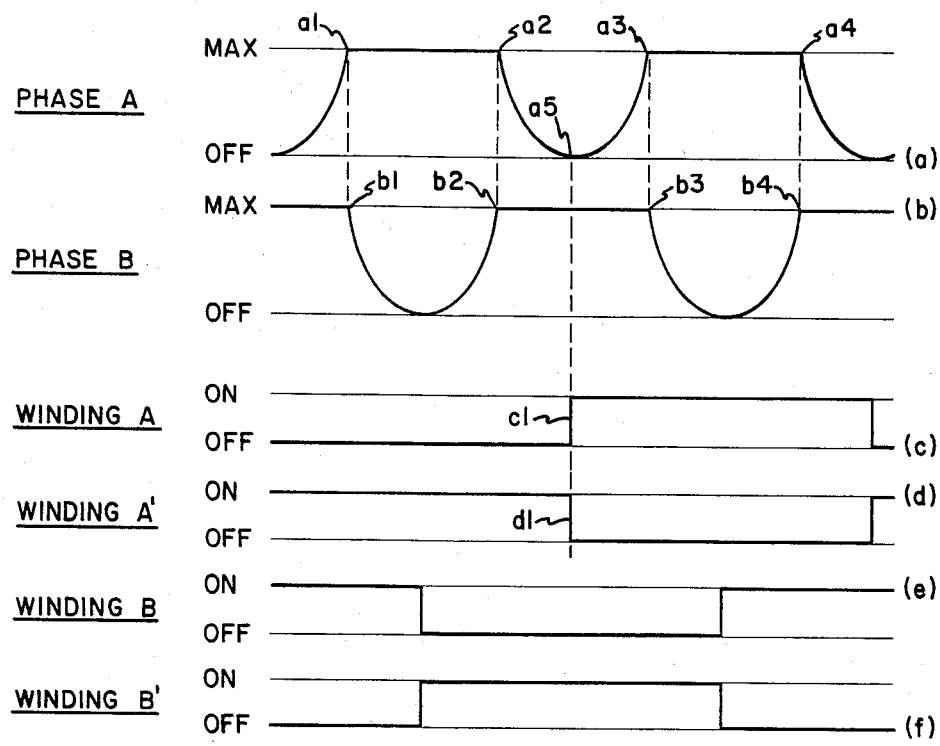
FIG. 4 shows phase current and winding on/off condition waveforms for the same motor driven in the microstepping range of the present invention.

Referring to FIG. 4, phase current and winding on/off condition waveforms are shown for the present invention in its microstepping mode and are designated as for similar waveforms on FIGS. 2 and 3. Curves (a) and (b) of FIG. 4, however, differ significantly from curves (a) and (b) of FIG. 2 in that the phase currents in the present invention are not microstepped at all times. Rather, one phase is held at maximum current while the other phase is microstepped and these roles are alternately reversed. For example, Phase A is held at maximum current from point a1 to point a2 while over the same period of time Phase B is microstepped from point b1 to point b2, the latter points corresponding in time with points a1 and a2, respectively. Likewise, Phase B is held at maximum current from point b2 to point b3 while Phase A is microstepped from point a2 to point a3, the latter points corresponding in time with points b2 and b3, respectively. As was the case with the conventional microstepping mode shown on FIG. 2, in the new microstepping mode shown on FIG. 4 switching of the windings in a phase occurs when the current in that phase is zero. For example, when the Phase A current is zero, as at point a5 on FIG. 4, Winding A is switched from off to on at point c1, and Winding A' is switched from on to off at point d1. Thus, winding on/off condition waveforms are the same for both the conventional and the new microstepping.

Figure 5:
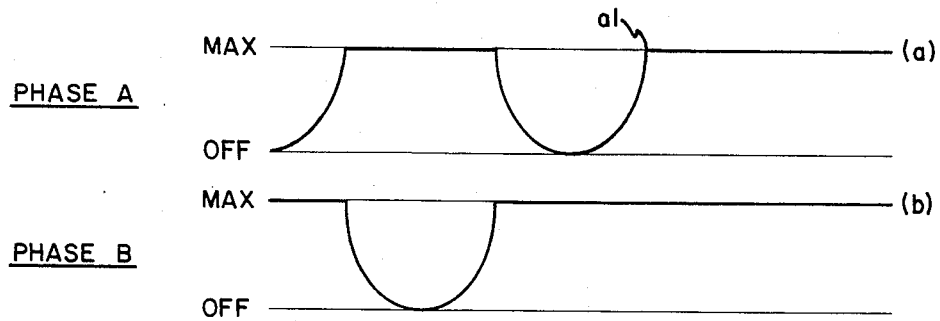
FIGS. 5 and 6 show, respectively, phase current waveforms for the same motor in the transitions from microstepping to full-stepping and from full-stepping to microstepping in accordance with the method of the present invention, for the same motor.
Figure 6:
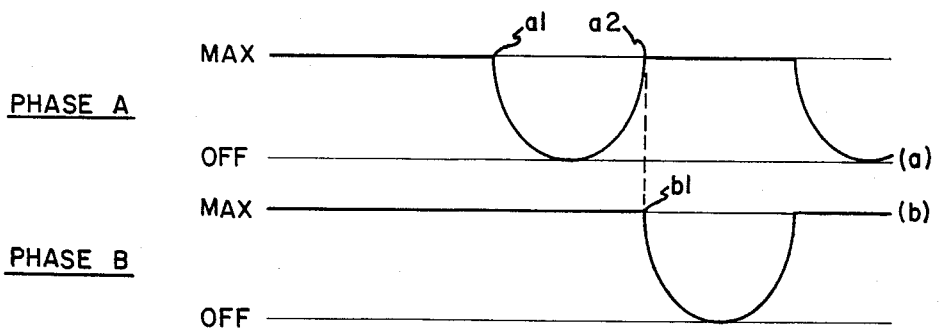

The new microstepping of the present invention provides points in time or "synchronizing edges" at which transition from microstepping to full-stepping or from full-stepping to microstepping may be accomplished without causing a disturbance in either phase, since the currents in the phases are identical to those in either stepping mode. One synchronizing edge occurs, for example, at the time corresponding to points a1 and b1 on FIG. 4. Likewise, similar synchronizing edges occur at the times corresponding to the pairs of points a2 and b2, a3 and b3, and a4 and b4. At these times, both phases are at maximum current and, therefore, a transition between stepping modes will not cause a disturbance. If the transition is from microstepping to full-stepping, for example at the synchronizing edge at point a1 on FIG. 5, both phases will simply remain at full current subsequent to that time. If the transition is from non-microstepping to microstepping, for example at point a1 on FIG. 6, Phase A will commence the microstepping sequence and at the end of one microstep cycle, corresponding to points a2 and b1, Phase B will commence microstepping.

Figure 7:
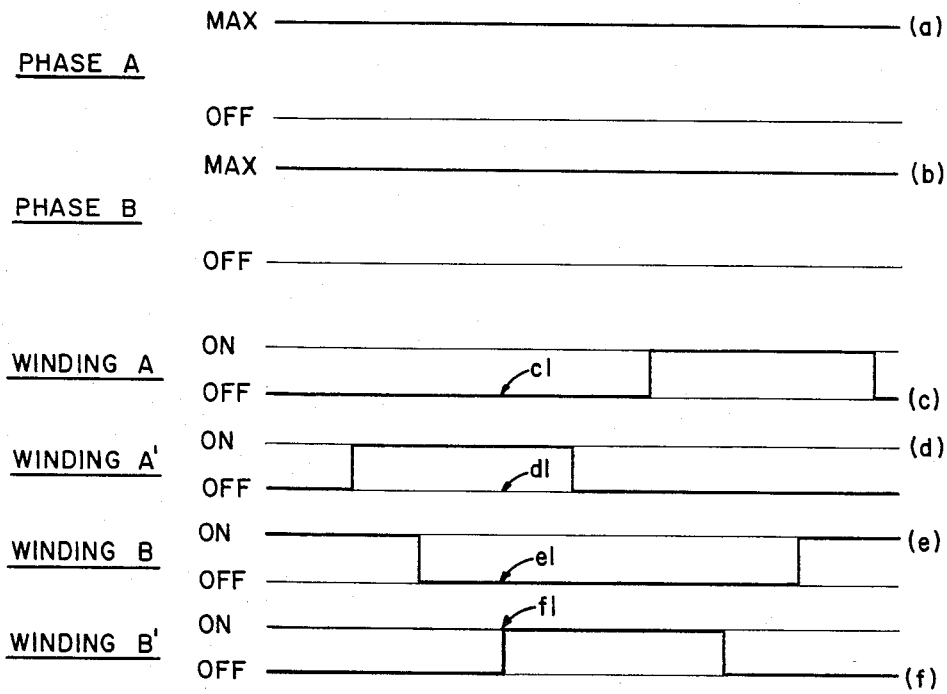
FIG. 7 shows phase current and winding on/off condition waveforms for the same motor in a half-stepping mode.

Transition to microstepping from non-microstepping or to non-microstepping from microstepping is not limited to the case when the non-microstepping mode is a full-stepping mode, as has been described above. The invention may be employed when the non-microstepping mode is any within the capability of the digital motor. For example, the two-phase, four-winding digital motor under consideration may be operated in one other non-microstepping mode, namely, a half-stepping mode. FIG. 7 shows the phase current and winding on/off condition waveforms for such a motor driven in a half stepping mode. The waveforms are similar to those for full-stepping shown on FIG. 3, except that the winding on/off condition waveforms for half-stepping show the characteristic one-on/two-on/one-on stepwise sequence of winding energization.

Figure 8:
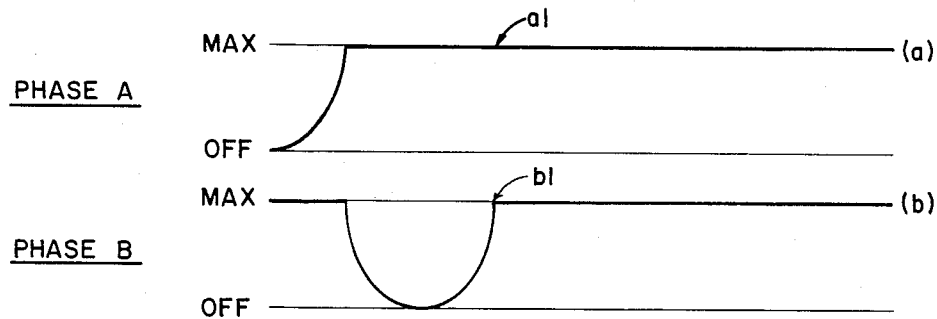
FIGS. 8 and 9 show, respectively, phase current waveforms for the same motor in the transitions from microstepping to half-stepping and from half-stepping to microstepping in accordance with the method of the present invention, for the same motor.
Figure 9:
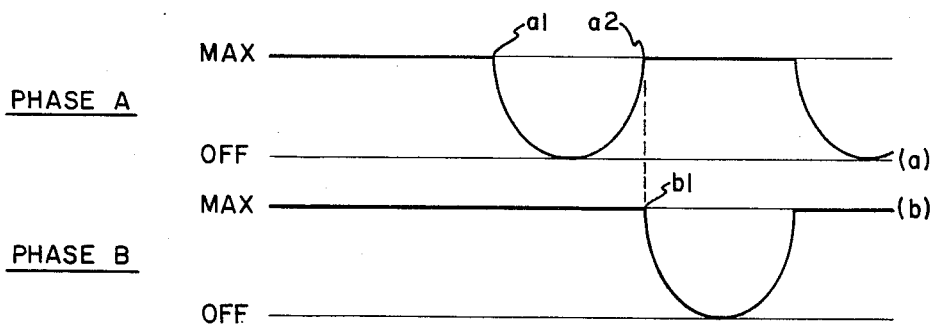

Transition to and from half-stepping similarly takes place at synchronizing edges. FIG. 8 shows the phase current waveforms for the transition from microstepping to half-stepping at the points a1 and b1, corresponding in time to points c1, d1, e1, and f1 on FIG. 7. At this point in time, Phase A (FIG. 8) remains at maximum current, Phase B has reached maximum current and will remain at that level, and the windings are in the two-on condition of half-stepping (FIG. 7) and will subsequently follow the half-stepping pattern shown. Likewise, transition from half-stepping to microstepping could take place at point a1 on FIG. 9, also corresponding in time to points c1, d1, e1, and f1 on FIG. 7.

At that point in time, Phase A (FIG. 9) would commence microstepping and Windings A and A' would start to be switched in the pattern shown on FIG. 4. At the point in time corresponding to points a2 and b2 on FIG. 9, Phase B would commence microstepping and its windings would also start to be switched in the pattern shown on FIG. 4.

Figure 10:
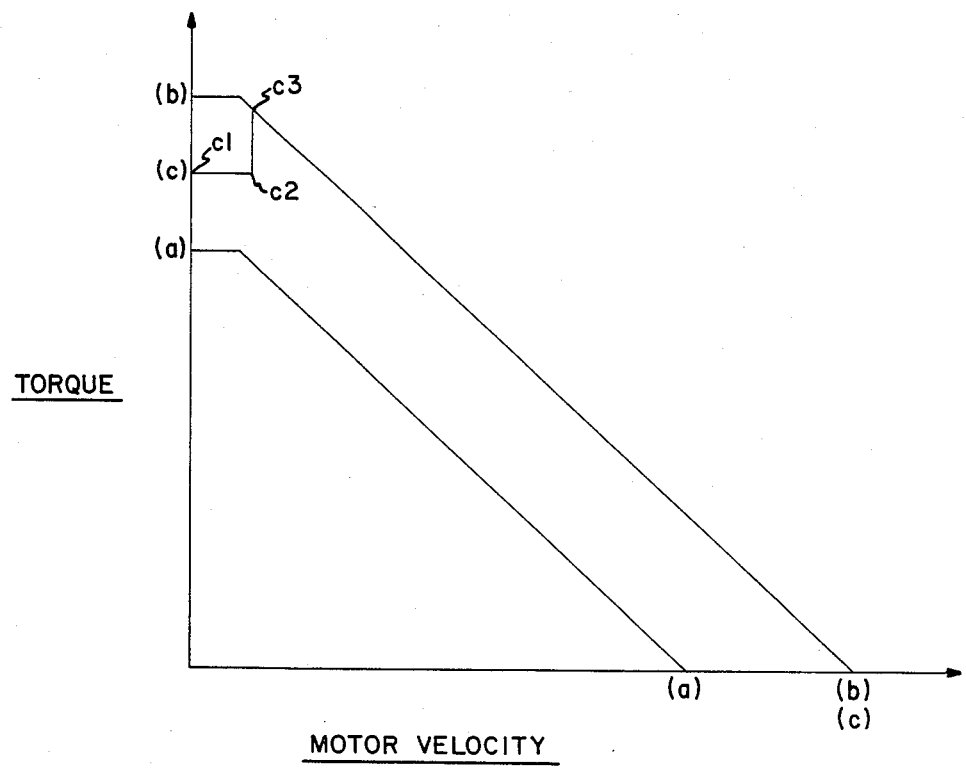
FIG. 10 shows torque as a function of motor velocity for a digital motor controlled by conventional microstepping, by full-stepping, and by the present invention.

A significant advantage of the present invention is shown on FIG. 10. Curve (a) represents, for the motor described above, torque as a function of motor velocity for conventional microstepping, while curves (b) and (c) represent similar relationships, respectively, for full-stepping and the present invention. The segment of curve (c) between points c1 and c2 represents the microstepping mode of the invention, while the vertical segment between points c2 and c3 represents the transition point. At velocities above that at point C3, the motor is operated in non-microstepping mode. For any given motor velocity, the torque produced with conventional microstepping is about 70 percent of the torque produced with full-stepping. Although not indicated on FIG. 10, the half-stepping mode torque is approximately 85-90 percent of the full-stepping mode torque. Over the microstepping range of the present invention, the torque produced is about 85 percent of full-stepping, since there is at all times at least one phase that is at maximum current. When the present invention is in the full-stepping mode, full torque is, of course, obtained.

Either transition might desirably take place when the motor velocity is on the order of 500 full steps per second, since microstepping is of little value at higher motor velocities and high-speed transmission lines and shielded cables can be avoided if the transition is made at that velocity. However, the transition may be made at any predetermined velocity. Additionally, if desired to further reduce unnecessary high-speed pulses, the number of microsteps per full step may be successively reduced as motor velocity increases in the microstepping range.

It will accordingly be understood that there has been disclosed a control method for digital motors that permits the use of microstepping at low motor velocities and permits the use of non-microstepping at higher motor velocities, while providing for a smooth transition whether from microstepping to non-microstepping or from non-microstepping to microstepping. Additionally, the transition point may be chosen so that the need for high-speed transmission lines or shielded cables is eliminated.

Since certain changes may be made in carrying out the above-described invention without departing from the scope thereof, it is intended that all matter contained in the above description or shown in the accompanying Drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A method for continuously controlling a digital motor, comprising:
    (a) operating the motor in a microstepping mode over a first range of motor velocities;
    (b) operating the motor in a non-microstepping mode over a second range of motor velocities; and
    (c) switching from one stepping mode to the other at a predetermined motor velocity.

2. A method for controlling a digital motor having a multiplicity of phases, to allow operation in a microstepping mode over a first range of motor velocities below a predetermined velocity and to allow operation in a non-microstepping mode over a second range of velocities above the predetermined velocity, while providing for transition between the two modes, comprising:
    (a) providing energizing currents to the phases, the energizing currents having waveforms such that, at recurring times, current conditions exist simultaneously in each phase which are identical to current conditions which would exist at those times in either microstepping or non-microstepping mode;
    (b) switching from one stepping mode to the other at one of such times; and
    (c) switching from one mode to the other at the predetermined velocity.

3. A method for controlling a digital motor, having first and second phases, to allow operation in a microstepping mode over a first range of motor velocities above a predetermined velocity and to allow operation in a non-microstepping mode over a second range of velocities above the predetermined velocity, while providing for transition between the two modes, comprising:
    (a) operating the motor in a microstepping mode by providing maximum current to the first phase while providing microstepping current to the second phase, for a first full motor step;
    (b) at the end of the first full motor step, providing maximum current to the second phase while providing microstepping current to the first phase, for a second full motor step;
    (c) successively alternately providing maximum and microstepping currents to the first and second phases for subsequent full motor steps;
    (d) switching from the microstepping mode to the non-microstepping mode at the end of any full motor step;
    (e) switching from the non-microstepping mode to the microstepping mode at the end of any full motor step; and
    (f) switching from one mode to the other at the predetermined motor velocity.

4. A system for continuously controlling a digital motor, comprising:
    (a) control means for providing pulses to the motor;
    (b) translator means, responsive to input commands, for providing signals to the control means such that the motor may be operated in a microstepping mode over a first range of motor velocities and operated in a non-microstepping mode over a second range of velocities; and
    (c) wherein the translator means causes the motor to switch from one stepping mode to the other at a predetermined velocity.

5. A system for controlling a digital motor having a multiplicity of phases, to allow operation in a microstepping mode over a first range of motor velocities below a predetermined velocity and to allow operation in a non-microstepping mode over a second range of velocities above the predetermined velocity, while providing for transition between the two modes, comprising:

(a) control means for providing pulses to the motor; and (b) translator means, responsive to input commands, for providing control signals to the conrol means such that energizing currents provided to the phases have waveforms such that, at recurring times, current conditions exist simultaneously in each phase which are identical to current conditions which would exist in either microstepping or non-microstepping mode, and the motor may be switched at the predetermined velocity from one stepping mode to the other at one of such times.

6. A system for controlling a digital stepping motor, having first and second phases, to allow operation in a microstepping mode over a first range of motor velocities below a predetermined velocity and to allow operation in a non-microstepping mode over a second range of motor velocities above the predetermined veloctiy, while providing for transition between the two modes, comprising:

(a) control means for providing pulses to the motor; and (b) translator means, responsive to input commands, for providing signals to the control means such that the motor is operated in a microstepping mode by having maximum current provided to the first phase while having microstepping current provided to the second phase, for a first full motor step, then at the end of the first full motor step, having maximum current provided to the second phase while having microstepping current provided to the second phase, for a second full motor step, then having provided successively alternately maximum and microstepping currents to the first and second phases for subsequent full motor steps; the motor may be switched at the predetermined velocity from a microstepping mode to a non-microstepping mode at the end of any full motor step; and the motor may be switched at the predetermined velocity from a non-microstepping mode to a microstepping mode at the end of any full motor step.

* * * * *